Aug. 19, 1958    J. HURST    2,848,110
SIEVES AND STRAINERS

Filed Dec. 22, 1955    6 Sheets—Sheet 1

INVENTOR
J. HURST
By Mawhinney & Mawhinney
ATTYS.

Aug. 19, 1958 J. HURST 2,848,110
SIEVES AND STRAINERS
Filed Dec. 22, 1955 6 Sheets-Sheet 2

INVENTOR
J. HURST
By Mawhinney & Mawhinney
ATTYS.

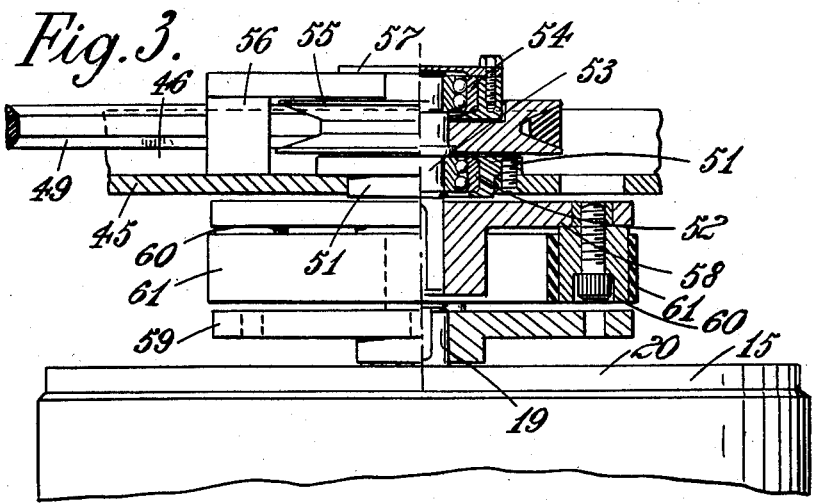
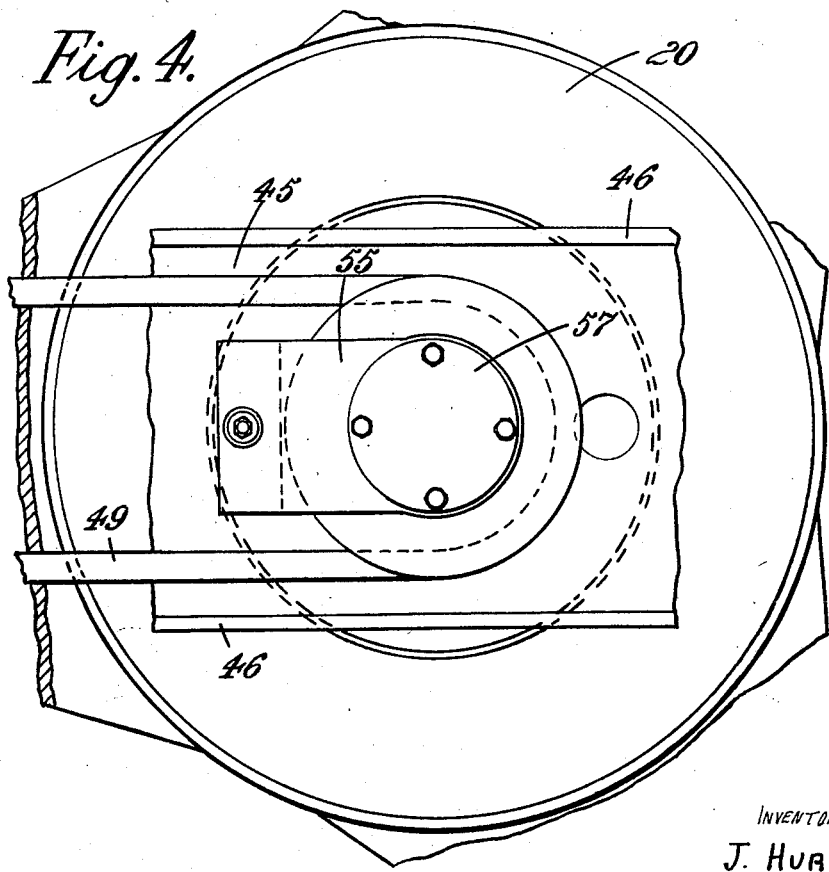

Aug. 19, 1958 J. HURST 2,848,110
SIEVES AND STRAINERS
Filed Dec. 22, 1955 6 Sheets-Sheet 4

INVENTOR
J. HURST
By Mawhinney & Mawhinney
ATTYS.

Aug. 19, 1958  J. HURST  2,848,110
SIEVES AND STRAINERS
Filed Dec. 22, 1955  6 Sheets-Sheet 5

INVENTOR
J. HURST
by Mawhinney & Mawhinney
ATTYS.

United States Patent Office 2,848,110
Patented Aug. 19, 1958

2,848,110

SIEVES AND STRAINERS

Justin Hurst, Mayfield, England, assignor to Russell Constructions Limited, London, England, a British company Application December 22, 1955, Serial No. 554,792

Claims priority, application Great Britain December 24, 1954

9 Claims. (Cl. 209—332)

This invention comprises improvements in or relating to sieves, strainers and the like.

Hereinafter in this specification the expression sieve is used as including any sifting or strainer system whether for separating powdered solids or straining material out of liquids.

The invention relates to shaking sieves of the kind which comprise a sieve-supporting frame flexibly mounted on suspension rods to move in a horizontal plane and associated with a fly-weight-casing containing a fly-weight rotatable about a vertical axis so that the sieve and its frame can be caused by operating the weight to move in a circular movement of small amplitude under the out-of-balance forces exerted on the frame by the fly-weight. The fly-weight usually takes the form of an out-of-balance fly-wheel.

It is an object of the invention to provide an improved construction of such sieves. Hitherto sieves of the kind referred to have been made in various forms. In one form the sieve supporting frame extended upwardly from the lower ends of the suspension rods through a fixed ring on which the upper ends of the rods were supported and carried the sieve at a level above the fixed ring; the fly-weight was in this case in a plane intermediate between the plane of the lower ends of the rods and the plane of the sieve, the aim being to get the weight at about the centre of gravity of the vibrating structure that is, of the frame plus sieve. In another form the rods were suspended from fixed side frames and the vibrating frame extended upwardly from the lower ends of the rods to a sieve located between the side frames at about the level of the upper ends of the suspension rods. The weight was again at about the plane of the centre of gravity of the vibrating structure. In both these prior constructions the weight was driven through a flexible coupling from a motor located below it.

The known structures are inconvenient for assembly and for the driving arrangements for the out-of-balance weight and are not well adapted for mounting at will in a variety of positions, —viz: on the floor, beneath a hole in a ceiling and slung from a height, all of which positions are demanded in practice. Moreover they afford a low factor of safety in use and show tendencies to fracture, which restricts their possible speed of operation.

The present invention envisages a sieve of the kind described comprising a main frame member consisting of a fly-weight casing, a fly-weight therein, outwardly extending members on the casing for attachment to suspension rods in substantially the same plane as the fly-weight, a sieve-base secured to but spaced from the main frame member above or below the same, and a sieve element secured to the sieve-base.

By arranging the fly-weight casing so that the fly-weight is substantially in the same plane as the attachments to the suspension rods, the casing carrying the attachment members directly, the construction of the apparatus is much simplified and it is found that an efficient and singularly adaptable unit is created because the sieve element may be either above or below the fly-weight casing or there may be sieve elements both above and below the fly-weight casing if desired. It is found in fact that this construction lends itself to use without expensive modification in all positions where sieves of the kind referred to are employed and that the ease of assembly and the accessibility of the parts is much improved.

The following is a description by way of example of certain constructions in accordance with the invention:

In the accompanying drawings,

Figure 3 is a side elevation partly in section to a larger scale of the driving arrangements for the fly-weight of the construction shown in Figures 1 and 2;

Figure 4 is a plan of the same;

Figure 1:
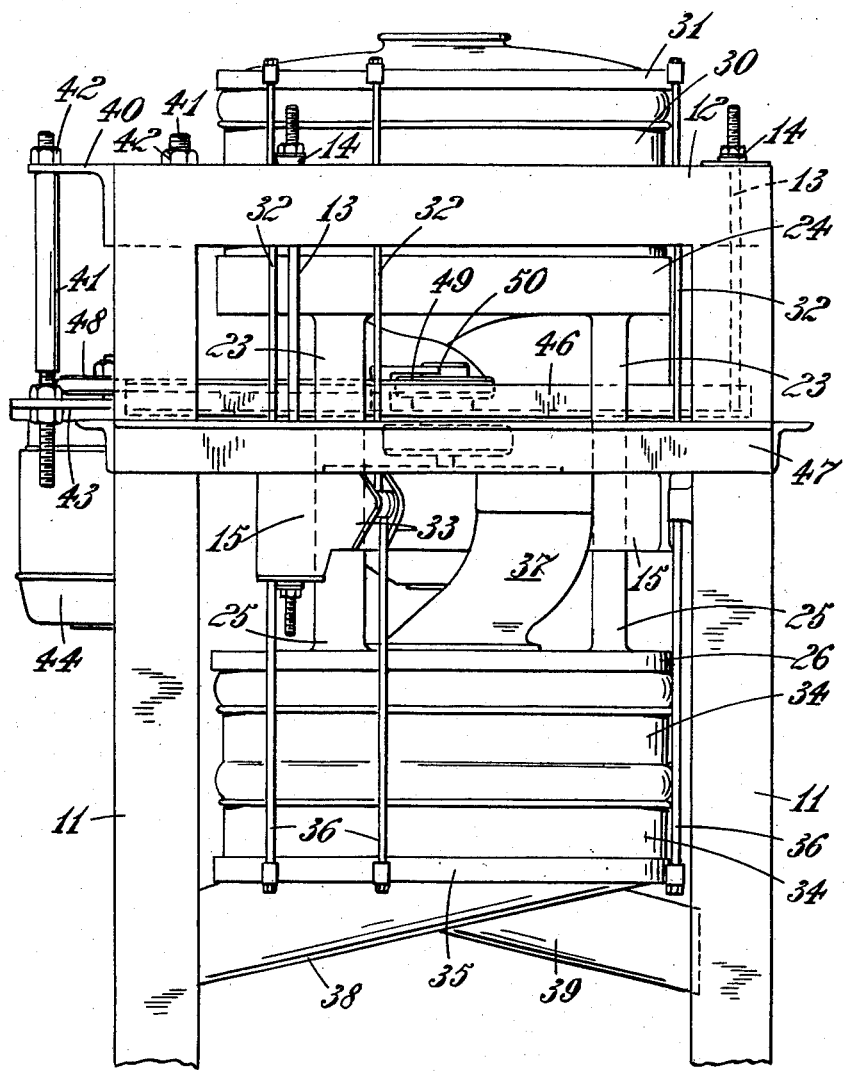
Figure 1 is a side elevation of one form of machine in accordance with the invention.
Figure 2:
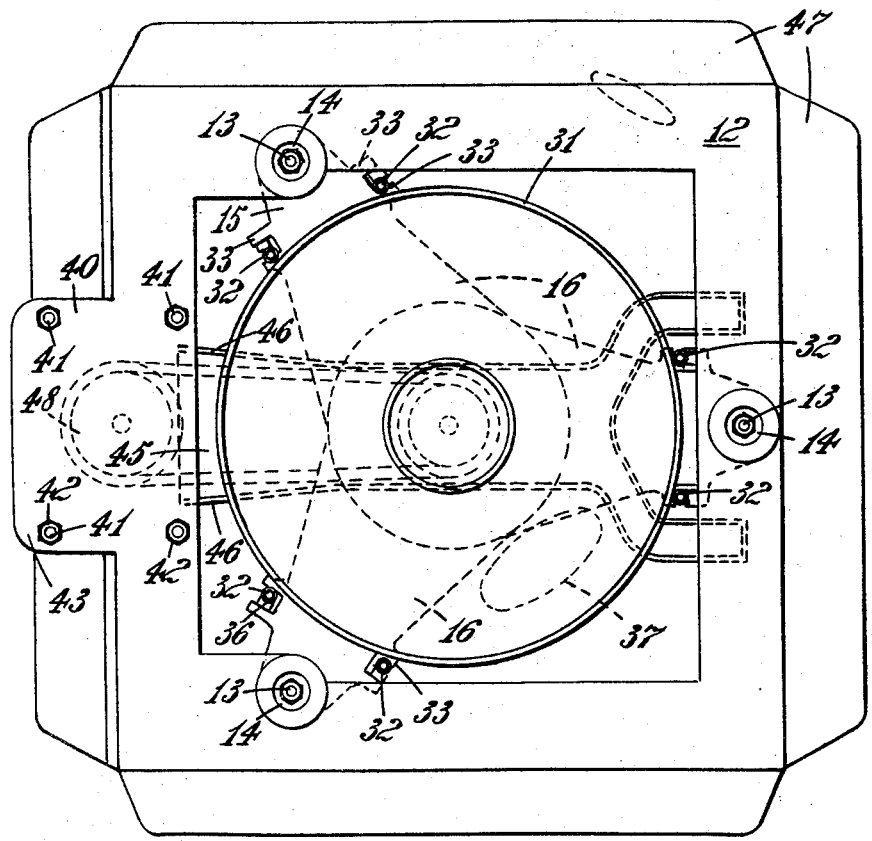
Figure 2 is a plan of the same.
Figure 5:
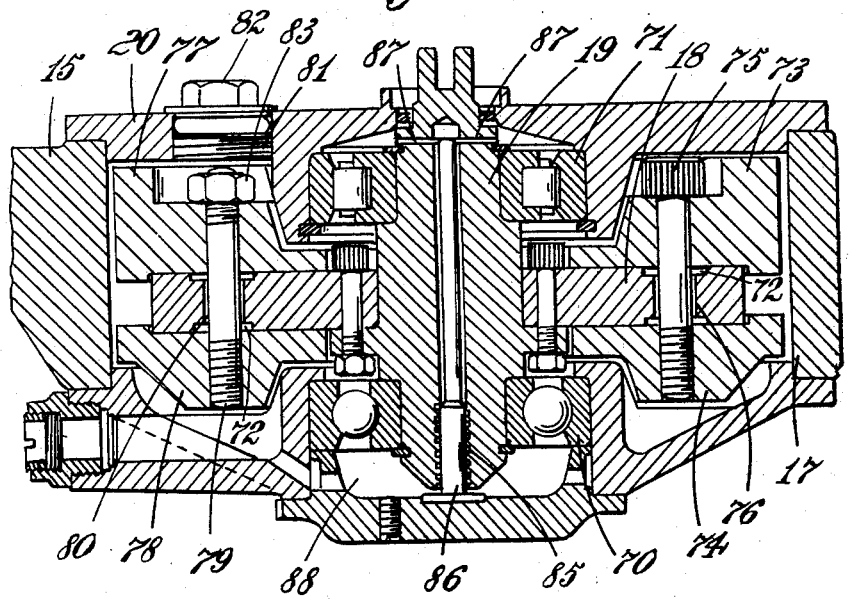
Figure 5 is a vertical section through the fly-weight casing.
Figure 6:
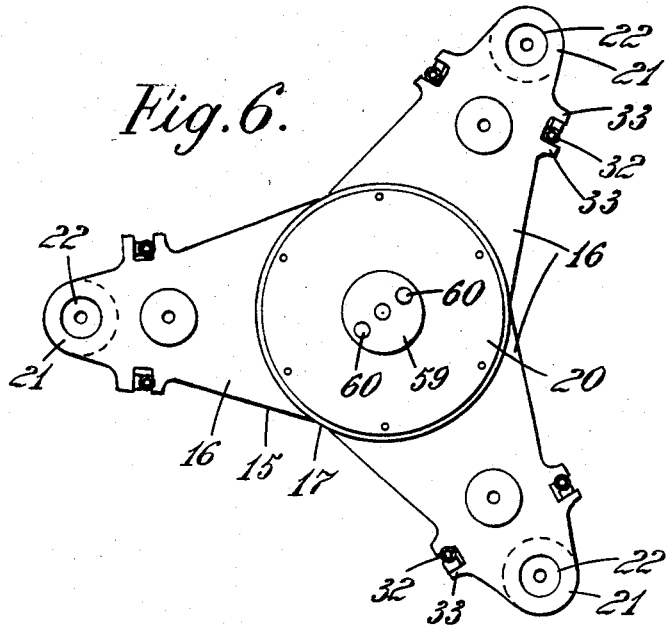
Figure 6 is a plan to a smaller scale than Figure 5 of the casing which contains the fly-weight casing and of the suspension brackets thereon.
Figure 7:
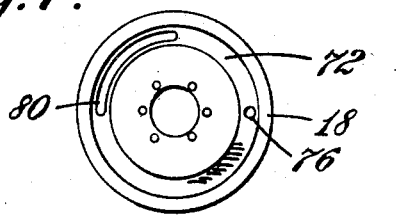
Figure 7 is a detail of the fly-wheel which carries the flyweight.

Referring first to the construction illustrated in Figures 1 to 7, this comprises an angle-iron framing consisting of uprights 11 which are welded at the top to a square frame 12 having an open centre and supporting three equidistantly spaced suspension rods 13 flexibly mounted in rubber bushes in sockets 14 at the top and extending downwardly into engagement with a three-armed casting 15 which constitutes a fly-weight casing shown in more detail in Figures 4, 5 and 6, but seen dotted in Figure 2.

The fly-weight casing 15 is in the form of a light alloy casting having three arms 16 and a hollowed out centre portion 17 to receive a fly-wheel 18 (Figures 5 and 7) rotatable about a vertical axis on a driving shaft 19. The fly-wheel carries an out-of-balance weight and its construction and mounting are hereinafter more fully described. It is enclosed beneath a cover 20 bolted to the casing 15.

The arms 16 carry at their outer ends, sockets 21 to receive rubber bushes 22 which surround the lower ends of the suspension rods 13. The out-of-balance fly-wheel 18 and the casing 15 are therefore free to move laterally by deflecting the suspension rods 13, and the rods all being of equal length, small lateral movements are sensibly in a horizontal plane. On the upper surface of the arms 16 there rest three legs 23 of a sieve base 24. The sieve base 24 comprises a ring of metal cast in one piece with the base and made of light alloy, and the three legs are drilled out to receive fixing bolts (not shown), the heads of which are sunk into the legs and the stems of which pass through the casting 15 and enter three inverted legs 25 of a similar casting 26 below the casting 15, into which the fixing bolts are secured. Thus the assembly of the three castings, the fly-weight casting 15 and the two sieve bases 24 and 26, is easily and simply effected.

The legs of the sieve bases space them from the fly-weight casting 15 for reasons which will hereinafter appear.

Attached to the upper sieve base 24 is a nest of sieves 30 of circular formation resting one above another and hereinafter more fully described with reference to Figure 8.

The nest of sieves is mounted by a clamping ring 31 and held to its base by tension rods 32 which extend upwardly from between ears 33 on the casting 15. The lower sieve base 26 similarly carries a nest of sieves 34 below it and these are clamped to the base 26 by a clamping ring 35 and tension rods 36 which are also held between the ears 33 on the casting 15. This general construction can be most easily understood by looking at Figure 9 of the drawings which in this respect is similar.

There is an outlet in the centre of the bottom of the upper nest of sieves 30 and this is taken by means of a bent conduit 37 of oval section to the centre of the top of the lowermost of sieves, between two of the arms 16 of the fly-weight casting 15. Moreover, discharge chutes from the sieves are provided as indicated at 38, 39, Figure 1. There is an inlet to the upper nest of sieves in the centre of the top thereof.

The frame 12 at the top of the standards 11 of the framework of the machine has a bracket 40 projecting outwards, and from the bracket 40 there depend two rigid columns 41 secured to the bracket by nuts 42. The horizontal surface of the bracket 40 is in the same plane as the horizontal upper surface of the frame 12 and the frame 12 carries two other columns 41 which form a support for a platform 43 supporting an electric motor 44. The platform 43 is in a plane a little higher than the plane of the fly-weight casting 15 and from it there extends across the frame above the fly-weight casting 15 and below the sieve base 24 is a bridge-member 45 which is of a shallow channel shape in cross-section with upstanding flanges 46 along its edges. The uprights 11 are strengthened by cross-members 47 at about the level of the space between the fly-weight casting 15 and the bridge-member 45, and the horizontal members 47 partly hide the parts just described, as viewed in Figure 1.

Above the motor 44 is a drive pulley 48 mounted on the motor shaft, which rotates on a vertical axis and the pulley 48 is connected by a belt 49 to a pulley 50 which, when the parts are at rest, is co-axial with the drive-shaft 19 of the fly-wheel 18. In the centre of the bridge 45 there is an opening in which is secured a housing 51 for a double row self-aligning ball race 52 which supports a pulley spindle 53 (see Figure 3 of the drawing). The pulley 50 is mounted on the spindle 53 and the spindle is further supported, above the pulley, by a ball bearing 54 housed in an arm 55 secured on a post 56 carried by the bridge-member 45. Above the spindle is a bolted-on cover 57. The spindle extends downwardly below the bridge-member 45 and carries a coupling member 58, while the drive shaft 19 of the fly-wheel extends upwardly above the cover 20 of the fly-weight casing 15 and carries a similar coupling member 59. Each of the coupling members 58, 59 carries two diametrically opposite drive pins 60, the position of which on the coupling member 59 can be seen in Figure 6. The drive pins of the upper coupling member 58 are at right angles to the drive pins of the lower coupling member 59, and a flexible rubber ring 61 having four apertures to receive the drive pins 60 couples them together and permits the drive to occur even although the shaft 19 should be displaced somewhat from co-axiality with the spindle 53. The result is that when the electric motor drives the pulley 50 by the belt 49, the fly-wheel 18 is rotated and being out of balance it applies out of balance forces to the casing 15, which being free to move laterally due to the flexibly mounted suspension rods 13, is caused to move in a circular path of small amplitude which is allowed for by the flexible rings 61 in the coupling.

Referring now to Figure 5, the fly-wheel 18 is supported in the central portion 17 of the casing 15 on a stiff vertical shaft 19 which runs in a ball bearing 70 below the fly-wheel and a heavy roller bearing 71 above it, both these bearings being located inside the casing 15. The shaft 19 passes up through the top of the casing and carries the coupling member 59 above the casing as already described. The fly-wheel 18 is made of a strong steel forging and it has grooves 72 (Figure 7) in its upper and lower surfaces. At one side of the fly-wheel there is secured a pair of quadrant-shaped upper and lower out-of-balance weights 73, 74, by a set-screw 75 passing through a hole 76 in the groove 72. A second pair of quadrant-shaped out-of-balance weights 77, 78 are fitted in the grooves 72 of the fly-wheel surface and held by stud 79 passing through a quadrantal slot 80 in the fly-wheel and nut 83. These weight can be moved around the fly-wheel from a position where they are opposite to the first out-of-balance weights 73, 74 (and therefore put the fly-wheel into balance or approximately so) until they come alongside the first pair. The fly-wheel will then be out-of-balance to its maximum extent and at intermediate positions of the movable weights the degree of out-of-balance would be varied between this maximum and a minimum. There is a hole 81 in the cover of the fly-weight casing containing a removable plug 82, below which the nut 83 on the stud 79 can be brought, so that a box spanner can be inserted through the hole 81 and the weight can be freed, moved and tightened again. By this means adjustment to any degree of out-of-balance desired can be effected.

The loads on the ball and roller races 70, 71 of the fly-wheel, when running at high speed, are very heavy. The most efficient speed to run the sieves in normal cases is very high, and should preferably exceed 2,000 revolutions per minute (even rising to over 3,000 revolutions per minute) and with a diameter of each nest of sieves of the order of two feet, the weights are such that the load on the bearings may run into tons. This is all the more the case, bearing in mind that the apparatus according to the present invention is intended to support sieves below the fly-weight casing as well as above it. In order to assist the bearings to withstand this combination of high speed and high load, the fly-wheel shaft 19 is made hollow and is cut with a square-section screw thread 85 in its lower portion. In the middle of the bottom of the fly-weight casing there is a fixed upstanding rod 86 which passes through the screw threaded portion of the shaft and thence upwardly to near the top of the shaft. At the top the shaft 19 is drilled transversely with two oil-spraying openings 87. The bottom of the fly-wheel casing is constructed as an oil sump 88. When running, the screw thread 85 in the shaft acts as a pump and under the high speed conditions delivers oil at a substantial pressure to the transverse oil spraying openings 87 at the upper end thereof. These openings spurt oil on to the upper roller race 71 which takes the greater part of the load and from here the oil falls freely inside the casing and eventually reaches the lower race which works partly drowned in the sump. The result is an extremely quiet and well lubricated operation of the fly-wheel.

Figure 8:
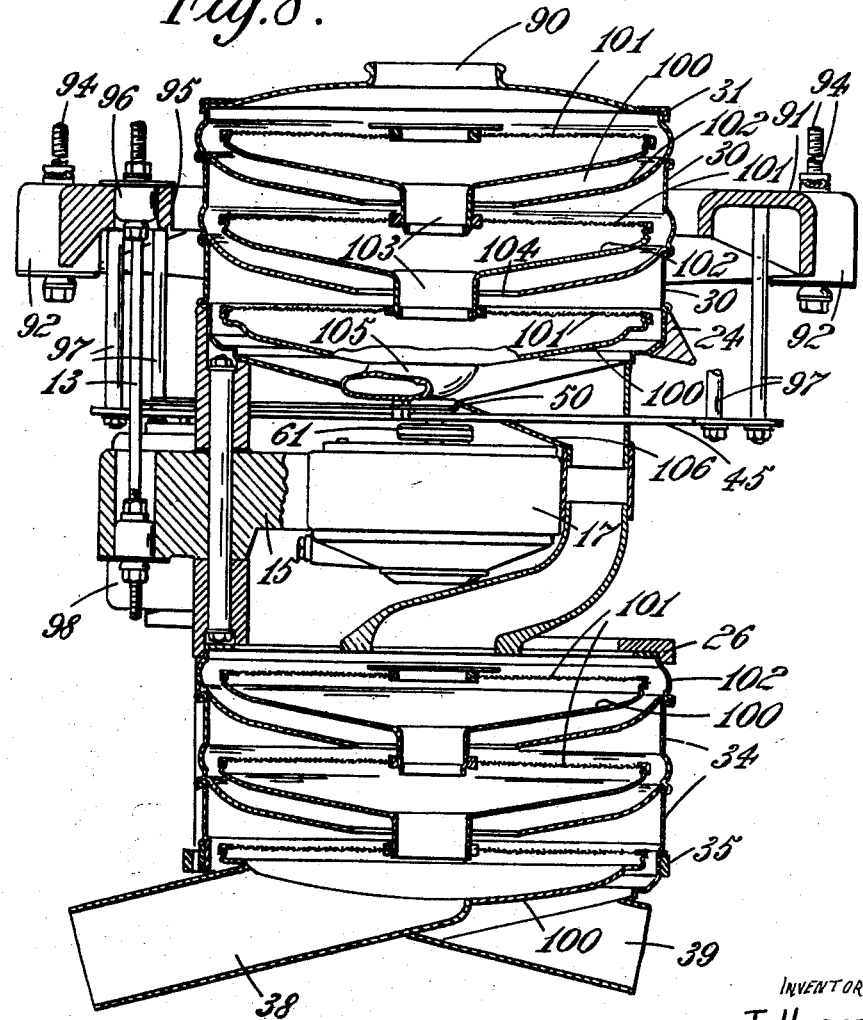
Figure 8 is a vertical section through a second construction intended for ceiling mounting.
Figure 9:
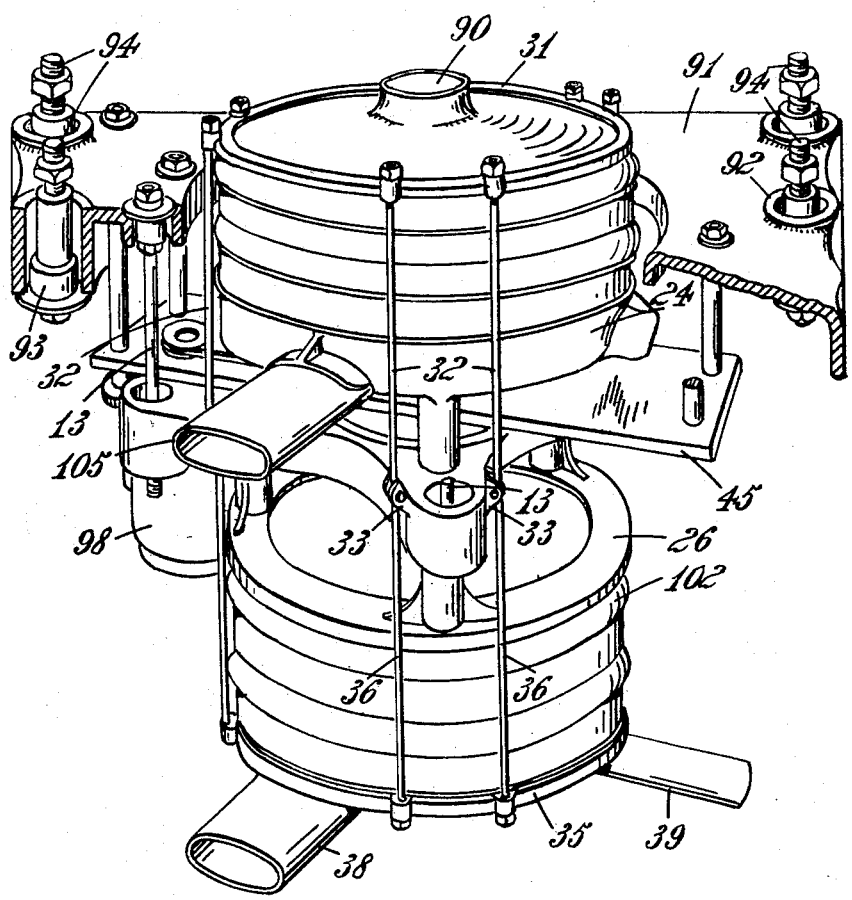
Figure 9 is a perspective view of a part of the construction shown in Figure 8.

Referring now to Figures 8 and 9, these show a generally similar construction of sieve which is intended for ceiling mounting so that the inlet 90 at the top of the sieve projects through a hole in a floor above the ceiling. Instead of the angle-iron-frame which is shown in Figures 1 and 2, there is a casting 91 which is provided along each end with a number of sockets 92 to receive rubber bushes 93 around securing bolts 94 by which it may be attached to the joists which support the ceiling around it. The flexible suspension rods 13 extend downwardly from the casting 91 through sockets 95 which contain resilient bushes 96 and they enter the three-armed fly-weight casing member 15 and are resiliently connected to it in the manner already described. Rigid depending rods 97 from the casting 91 carry a bridge-member 45 which is in general similar to the member 45 already described but which also acts as a platform to support the motor 98. The motor drives a pulley 50 and through it the fly-wheel in the casing 17 by way of a rubber ring 61 as already described.

Figures 8 and 9 also serve to show clearly the three-legged sieve bases 24 and 26 and the method of securing them in place on the casting 15 together with the tension rods 32 which hold the clamping rings 31 and 35. It will be observed that each sieve section consists of an inner conical member 100 over which is stretched a sieve cloth 101 and which is located within and spaced from an outer bowl 102. The conical sieve supporting members 100 have central funnel-shaped outlets 103 for fine material which passes through the sieves, and the coarse material which passes out over the outer edges of the sieve cloth into the bowl 102 in each case is delivered by the bowl 102 through a central opening 104 which surrounds the funnel member 103 on to the cloth 101 of the sieve below. The fines of the upper section of the sieve above the casting 15 all drop through the central funnels 103 into the lowermost cone 100 which is not fitted with a funnel but with a chute 105 which passes through the wall of the sieve base 24 and carries them out of the machine. The coarse material from the lowermost sieve is collected by a large funnel 106 which delivers it into the curved conduit 37 already referred to which carries the over-sized material to the lower sieves below the sieve base 26. The latter are similarly constructed to the upper sieves already described and have a fines outlet 38 and a coarse outlet 39.

It will be appreciated that either the upper or the lower next of sieves can be omitted if desired or both can be made to work independently, one of the other. The casting 91 which anchors the upper ends of the suspension rods together may, instead of being secured to a ceiling, be secured to a fixed frame if desired, or it may be slung from a travelling crane. It may be easily fixed in many other positions and the variations of design which have hitherto been necessary to meet many various cases are obviated.

I claim:

1. A sieve comprising in combination a sieve-supporting fly-weight casing, a fly-weight therein, outwardly extending members on the casing, suspension rods flexibly secured to said outwardly extending members in substantially the same plane as the fly-weight, means for supporting the suspension rods flexibly, a sieve base secured to and spaced from the fly-weight casing, a sieve element secured to the sieve base, and means for driving the fly-weight to produce circular vibration in the casing and parts mounted thereon.

2. A sieve as claimed in claim 1 having two sieve bases, one secured above and the other below the fly-weight casing, sieve elements on both sieve bases and means to carry material from the sieve above the casing to the sieve below.

3. A sieve as claimed in claim 1 wherein the sieve element consists of a plurality of sieve frames, one upon another, and the frames are clamped to the sieve base by a clamping ring upon the frame furthest from the base and tension rods extending from the clamping ring to anchoring points on the outwardly extending members of the fly-weight casing.

4. A sieve as claimed in claim 1 wherein the means for driving the fly-weight comprise a bridge-member secured to the means for supporting the suspension-rods and extending across the axis of the fly-weight casing between said casing and the sieve base, a driving spindle upon the bridge, a flexible coupling between the spindle and the fly-weight and means for rotating the spindle.

5. A sieve as claimed in claim 4 wherein the means for rotating the spindle comprises an electric motor mounted on the means for supporting the suspension rods with its axis parallel to the spindle axis and a belt drive from the motor to the spindle.

6. A sieve as claimed in claim 1 wherein the means for supporting the suspension rods consists of a frame having an opening of a size to pass the sieve element freely and resilient bushes in the frame around the upper ends of said rods, the rods being of such length that the top of the sieve element projects above them to only a limited extent.

7. A sieve comprising a fly-weight casing, arms extending laterally outwardly therefrom, at least one sieve base supported on the arms so as to encircle the axis of the casing, resilient suspension arms attached to the arms, a fly-weight, a vertical shaft within the casing on which the fly-weight is secured, a sieve element secured to the fly-weight casing, an electric motor mounted beside the casing with its axis parallel to the axis thereof, and a flexible drive from the motor to the fly-weight.

8. A sieve as claimed in claim 7 wherein the fly-weight shaft is hollow and runs on bearings in the casing, the casing is formed as an oil-sump and oil-distributing ducts are formed in the upper end of said shaft to distribute oil derived from the sump to the said bearings.

9. A sieve as claimed in claim 8 wherein the hollow shaft contains a screw-pump to assist oil circulation.

References Cited in the file of this patent

UNITED STATES PATENTS

| 756,950 | Fraser et al. | Apr. 12, 1904 |
| 1,014,388 | Gray | Jan. 9, 1912 |
| 2,164,405 | Hintze | July 4, 1939 |

FOREIGN PATENTS

| 562,210 | Great Britain | June 22, 1944 |
| 574,410 | Great Britain | Jan. 3, 1946 |